United States Patent [19]
Lee

[11] Patent Number: 5,748,996
[45] Date of Patent: May 5, 1998

[54] DEVICE AND METHOD FOR SENSING BRIGHTNESS

[75] Inventor: Ki-yul Lee, Buk-ku, Rep. of Korea

[73] Assignee: Samsung Aerospace Industries, Ltd., Kyungsangnam-do, Rep. of Korea

[21] Appl. No.: 720,006

[22] Filed: Sep. 27, 1996

[30] Foreign Application Priority Data

Sep. 29, 1995 [KR] Rep. of Korea .................. 95-33027

[51] Int. Cl.$^6$ ......................................... G03B 7/00
[52] U.S. Cl. .................................. 396/63; 396/234
[58] Field of Search .......................... 396/63, 234

[56] References Cited

U.S. PATENT DOCUMENTS

| | | | |
|---|---|---|---|
| 3,091,162 | 5/1963 | Stimson | 396/63 |
| 3,185,052 | 5/1965 | Baron | 396/63 |
| 3,532,043 | 10/1970 | Shimomura et al. | 396/63 |
| 3,762,286 | 10/1973 | Hasegawa | 396/63 |
| 4,364,650 | 12/1982 | Terashita et al. | 396/234 |
| 4,394,078 | 7/1983 | Terashita | 396/234 |
| 4,754,299 | 6/1988 | Saegusa | 396/63 |
| 4,855,780 | 8/1989 | Hayakawa | 396/60 |
| 4,912,495 | 3/1990 | Ishikawa et al. | 396/63 |
| 4,951,082 | 8/1990 | Takagi | 396/234 |
| 5,146,258 | 9/1992 | Bell et al. | 396/234 |
| 5,184,172 | 2/1993 | Miyazaki | 396/234 |

*Primary Examiner*—Russell E. Adams
*Attorney, Agent, or Firm*—Finnegan, Henderson, Farabow, Garrett & Dunner, L.L.P.

[57] ABSTRACT

A device and a method for sensing brightness, by which a sensing area for measuring the brightness of an object is varied. The variation of the brightness sensing unit is in response to the variation of an image angle that varies according to the zoom position of the lens of a zoom camera. In this manner, photographs with optimum exposure can be obtained. The device comprises a zoom position sensing unit, a brightness sensing unit, and a control unit.

6 Claims, 4 Drawing Sheets

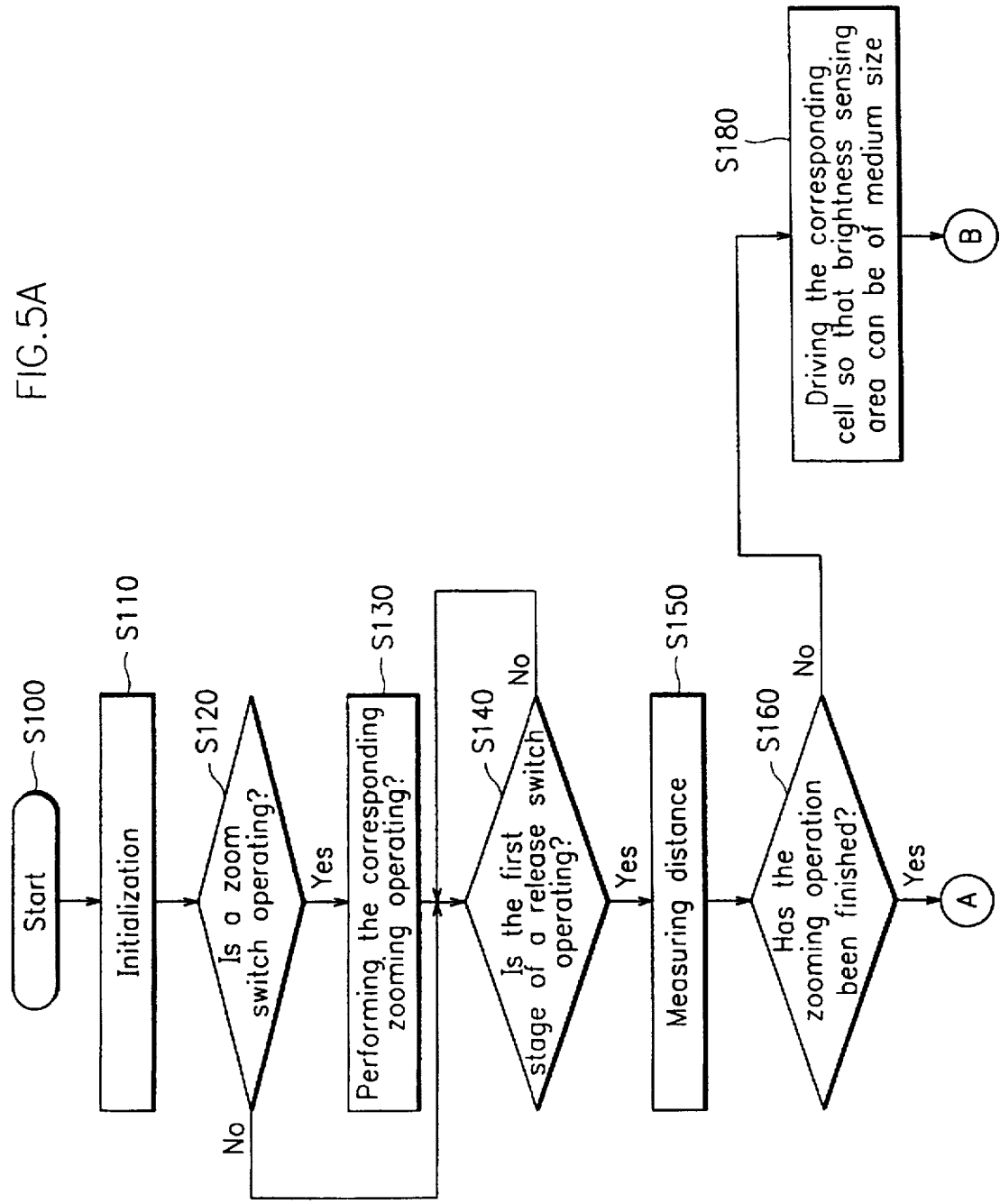

DEVICE AND METHOD FOR SENSING BRIGHTNESS

BACKGROUND OF THE INVENTION

(1) Field of the Invention

The present invention relates to a device and a method for sensing the brightness of an object by varying the sensing area of a zoom camera. More specifically, the sensing area varies in response to the variation of a photographed image angle. This image angle, in turn, varies according to the zoom position of a camera lens. In this manner, the brightness sensing area of a zoom camera is varied for obtaining photographs with optimum exposure.

(2) Description of the Prior Art

In general, there are two types of methods for measuring the brightness of an object. These are the Electric Eye (EE) type and the Through The Lens (TTL) type.

The EE method is used mainly for half size and simple leaf shutter type cameras. The EE method automates an exposure meter and a series of mechanical devices, such as a diaphragm and a shutter driven by the exposure meter. Thus, the exposing is automatically carried out by a camera's EE system as soon as a user presses a shutter release button.

The TTL method, on the other hand, is used mainly for reflex cameras. It is a focal plane method in which a photodetector is installed either in a finder optical system, in the front of a shutter curtain, or on the bottom plane of a sub-mirror's body. At either position, the photodetector is able to measure the brightness of light received through the lens.

Another method used is the average brightness sensing method. This method measures the average brightness of an image taken by a compact automatic zoom camera. When a photograph is being taken, the exposure value is set according to the brightness of an object as measured by the average brightness sensing method. The brightness is always measured for the same sensing area regardless of the image's angle taken in the film surface. By not taking into account this angle, however, the photograph may be overexposed or underexposed.

In other words, as shown in FIG. 1, the brightness sensing area of a photodetector installed in the finder optical system is set to a fixed angle θ. However, the brightness sensing area of the photodetector should be changed according to the variation of the position of a lens. For instance, the sensing area should be changed as the lens is varied over the range of A~C during a zooming operation.

In a 35 mm–70 mm double zoom camera, for example, the photographed image angle varies in the range of 63.4° ~34.30° with the zooming operation of the lens. This range is determined under the assumption that the photographed image angle is: 63.40° at the 35 mm zoom position of the wide angle stage A; 48.50° at the 48 mm zoom position of the intermediate stage B; and 34.3° at the 70 mm zoom position of the telephoto stage C. However, the brightness sensing angles of a conventional photodetector are fixed on the basis of the intermediate stage. Thus, the range of the conventional brightness sensing angle does not coincide with the range of the actually photographed image angle when the intermediate stage is excluded from the zoom position.

Therefore, when the lens is positioned at stage A, the photodetector's entire brightness sensing area is used to measure the brightness of the received light and to take a photograph. Since in that case, however, it is impossible to judge the condition of the peripheral parts of the photographed image, underexposure may occur in the real photograph when the peripheral field is bright. In addition, overexposure may occur when the peripheral field is dark.

Even when the lens is positioned in the telephoto stage C, the entire brightness sensing area of the photodetector is used to measure the brightness of the incident light and to take a photograph. Since in that case, however, the brightness sensing area is larger than that used, overexposure or underexposure may still occur.

SUMMARY OF THE INVENTION

It is therefore an object of the present invention to solve the above-mentioned problems of the prior art by providing a device and method for sensing brightness. The brightness sensing area of a camera is varied in response to the variation of an image angle which varies according to the zoom position of the lens. In this manner, photographs with optimum exposure can be obtained.

In order to achieve the above object, the present invention comprises a zoom position sensing unit which senses the position of a lens displaced according to a zooming operation. The zoom position sensing unit then outputs an electrical signal corresponding to the sensed position. Also included is a brightness sensing unit, formed of a plurality of cells having a separate brightness sensing area. The brightness sensing unit measures the brightness applied to each cell and outputs an electrical signal corresponding to the measured brightness. A control unit then detects the position of the lens according to the signal outputted from said zoom position sensing unit. The control unit selects the corresponding cell out of the cells of said brightness sensing unit in order to properly set the exposure value according to the detected position of the lens. Finally, the control unit outputs a driving signal for driving the corresponding cell.

In order to achieve the above-mentioned object, the present invention further comprises the steps of detecting the current position of a lens when a zooming operation is carried out. A brightness sensing area is then set according to the detected zoom position of the lens. A cell of the brightness sensing unit, corresponding to the preset brightness sensing area, is then driven. Finally, the brightness of an object is then measured.

BRIEF DESCRIPTION OF THE DRAWINGS

FIGS. 5A and 5B comprise a flowchart according to an embodiment of the present invention, which shows the operation of a camera in which the brightness sensing area is varied as the zoom position of a lens is varied.

DETAILED DESCRIPTION OF THE PREFERRED EMBODIMENTS

In the following description, the preferred embodiments of the present invention will be described in detail in conjunction with the accompanying drawings.

Figure 1:
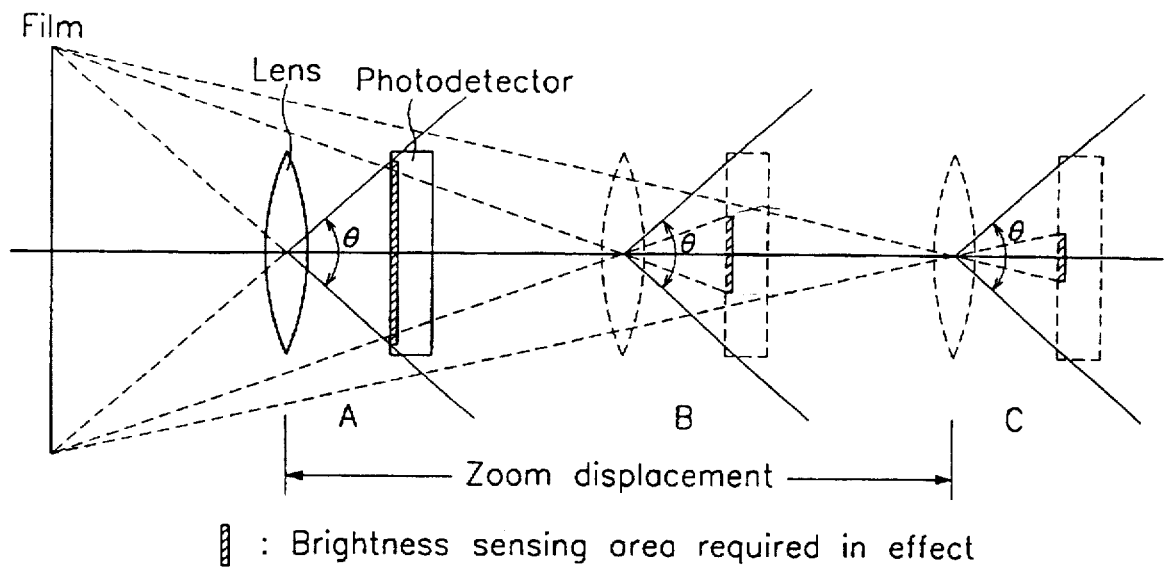
FIG. 1 is a state diagram showing the variation of the brightness sensing area of a conventional photodetector as the zoom position of a lens is varied.
Figure 2:
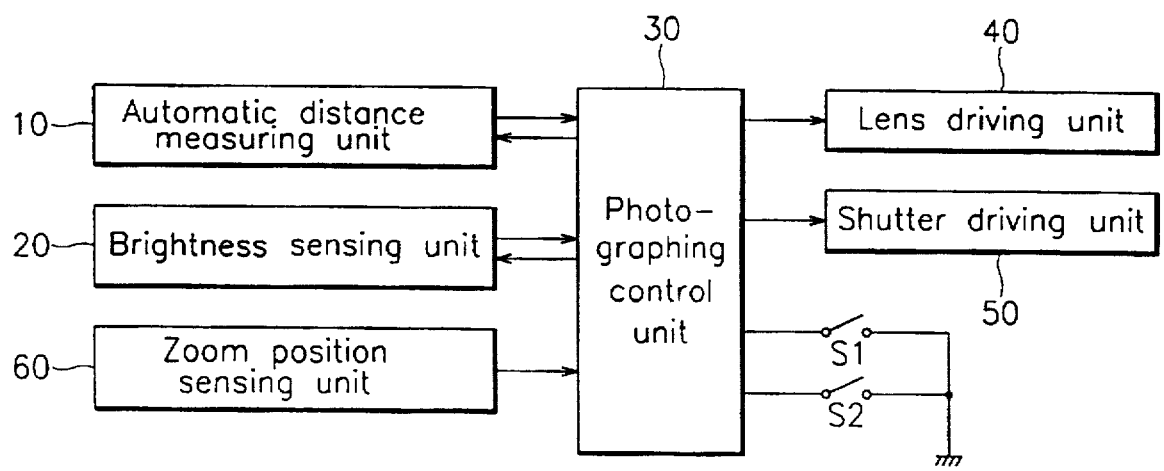
FIG. 2 is a block diagram of a camera according to an embodiment of the present invention, in which the brightness sensing area is varied as the zoom position of a lens is varied.

FIG. 2 shows a camera, according to an embodiment of the present invention, having a brightness sensing area which is varied according to the zoom position of the lens. The camera has a release switch S1 and a zooming switch S2. An automatic distance measuring unit 10 measures the distance of an object with respect to the camera. A brightness sensing unit 20, having a sensing area which varies according to an applied brightness sensing signal, measures the brightness of an object. A photographing control unit 30, which detects the variation of the len's zoom position according to the operation of the zooming switch S2, sets the brightness sensing area according to the zoom position. The control unit 30 then outputs a driving signal corresponding to the preset brightness sensing area. Also included is a shutter driving unit 50, a lens driving unit 40, and a zoom position sensing unit 60 for sensing the zoom position of the lens.

Figure 3:
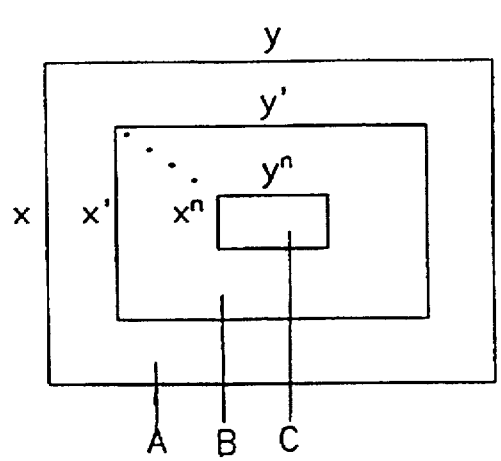
FIG. 3 is a diagram showing the structure of a brightness sensing unit according to an embodiment of the present invention.

As shown in FIG. 3, the brightness sensing unit 20 is divided into a plurality of cells A, B, C. Each cell of the brightness sensing unit 20 is driven separately.

Figure 5B:
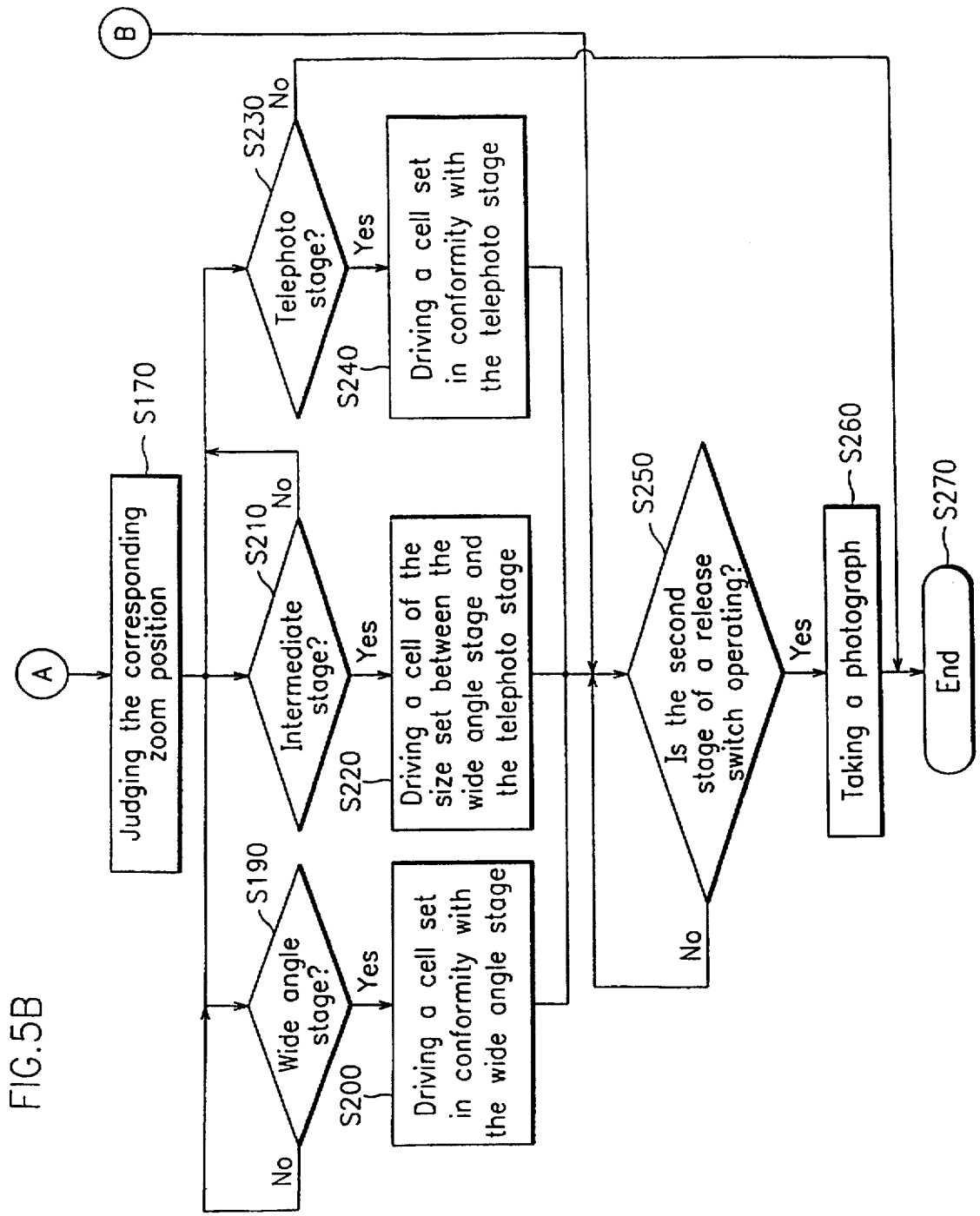

The operation of a camera having the brightness sensing device described will now be described with reference to FIGS. 5A and 5B. When power is applied to the camera, the photographing control unit 30 initializes all of the parameters to be used. The camera then enters into a state where it is ready to carry out a function according to a user's selection and operation of a switch (S110).

If, while in this ready state, a user operates the zooming switch S2 to take a photograph with zooming, then the photographing control unit 30 will output a lens driving signal. This driving signal is supplied to the lens driving unit 40 to drive the lens to a zoom position set according to the operation of the zoom switch S2. The driving unit 40 drives the lens (not shown) to place it at the corresponding zoom position (S120~S130).

If the first stage of the release switch S1 is operating when the zooming operation is completed, then the photographing control unit 30 drives the automatic distance measuring unit 10 to measure the distance of an object (S140~S150). In addition, the brightness sensing area is set in accordance with the zoom position of the lens to drive the brightness sensing unit 20.

In order for the brightness sensing area to be varied as the image angle is varied in a zooming operation of the lens, a cell constituting the brightness sensing unit is adjusted. The brightness sensing unit 20 is divided into a plurality of cells A, B, C so that each cell may have the size reduced in proportion to the film size.

As shown in FIG. 3, according to an embodiment of the present invention, the brightness sensing unit 20 comprises a photoconductive cell A. This cell can be divided into many smaller cells such as B, C, each having the same center and having a different brightness sensing area. The cells are divided such that the area of each cell is multiplied by a variable that approximates a standard film size, for example, 24 mm×36 mm. As shown in FIG. 3, with x representing the length of a cell's shorter side and y representing the cell's longer side, the division of the cell is made so that the following equation is satisfied.

(x*y)*α=the film size in common use (i.e., 24 mm×36 mm) In the equation above, α is a variable that varies according to a given ratio.

Figure 4:
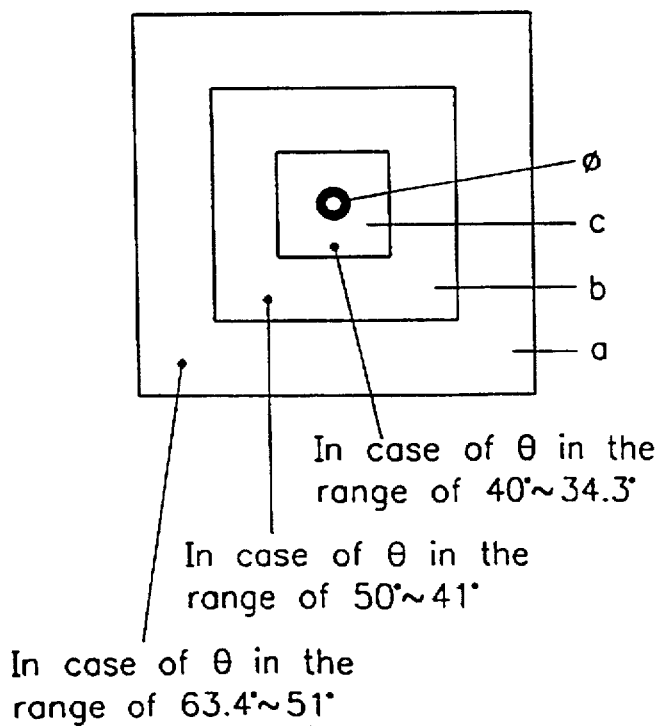
FIG. 4 is a diagram which shows the relationship between the zoom position of a lens and the brightness sensing area according to an embodiment of the present invention.

According to an embodiment of the present invention, as shown in FIG. 4, the brightness sensing unit 20 can be divided into three cells. Each of the cells has a different brightness sensing area, and the corresponding zoom positions of the lens are shown in the following Table 1. The labels a, b, c, and φ, as used in FIG. 4, designate sensing areas of the brightness sensing unit 20, with φ designating the sensing unit's central part.

TABLE 1

| Cell | Brightness Sensing Area | Corresponding Zoom Positions |
|---|---|---|
| A | a + b + c + φ | 38 mm ~ 45 mm |
| B | b + c + φ | 46 mm ~ 65 mm |
| C | c + φ | 66 mm ~ 90 mm |

As described above, when the brightness sensing unit 20 is divided into more than one cell, and the zooming operation is carried out according to the user's operation of the zooming switch S2, it is determined whether the first stage of the release switch S1 is operating. If the above is satisfied, then the photographing control unit 30 (FIG. 2) detects the zoom position of the lens according to the zooming operation (S160~S170; FIGS. 5A and 5B). The zoom position sensing unit 60 senses the position of the lens displaced to the corresponding zoom stage according to the operation of the zoom switch S2. It then sends a signal corresponding to the sensed position to the photographing control unit 30. The photographing control unit 30 then detects the zoom position of the lens according to the signal outputted from the zoom position sensing unit 60. In accordance with the detected zoom position, the control unit 30 then sets a brightness sensing area so that a proper exposure can be obtained.

In other words, when the current position of the lens corresponds to the wide angle stage according to the zooming operation, the sensing area of the brightness sensing unit 20 is set to the cell (a+b+c+φ) so that the sensing area can be the largest. On the other hand, when the position of the lens corresponds to the telephoto stage, the brightness sensing area is set to the cell (c+φ) so that the sensing area can be the smallest. Further, when the current zoom position of the lens corresponds to the intermediate stage, the brightness sensing area is set to the cell (a+b+φ) so that the sensing area can be of medium size.

Accordingly, the photographing control unit 30 transmits a driving signal to a cell of the brightness sensing unit 20. The brightness setting unit 20 is set according to the current zoom position of the lens, and measures the brightness of an object. That is, the cell (a+b+c+φ) is driven in case of the wide angle stage, and the cell (c+φ) is driven in case of the telephoto stage. Then, the brightness of an object is measured for the light incident through the driven cell (S190~S240).

The photographing control unit 30 then sets the exposure value according to the measured brightness and distance of an object. In addition, the control unit 30 drives the shutter driving unit 50 according to the operation of the second stage of the release switch to take a photograph (S250~S270).

Figure 6:
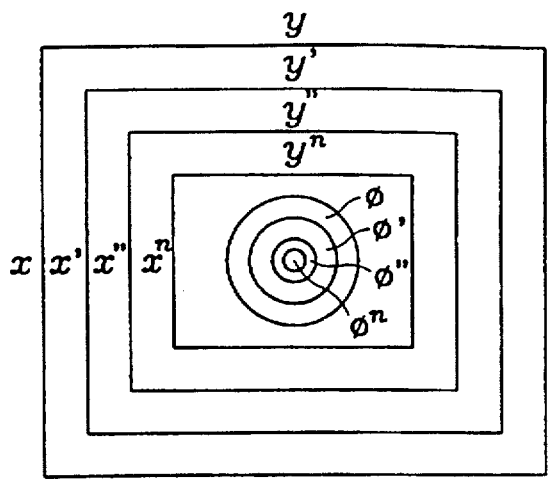
FIG. 6 is a diagram showing the structure of a brightness sensing unit according to another embodiment of the present invention.

In addition to dividing the brightness sensing unit 20 into more than one cell, the brightness sensing unit's central part can be divided into more than one sensor. The shape of each divided sensor, which is shown in FIG. 6, is similar to a circle so as to correspond to the zooming operation. The area of each sensor, when multiplied by a variable that varies to a given ratio, should correspond to an image angle according to the zooming operation.

The purpose of the provision of the circular sensors is to perform the functions of back light compensation and automatic flash exposure control under back light conditions. The sensing areas of the brightness sensing unit 20 and the corresponding circular sensors are as shown in the following Table 2.

TABLE 2

| Brightness Sensing Area | Corresponding Circular Sensor |
| --- | --- |
| $x * y$ | $\phi$ |
| $x' * y'$ | $\phi'$ |
| $x'' * y''$ | $\phi''$ |
| $x^n * y^n$ | $\phi^n$ |

As described above, a circular cell is formed in the central part of a brightness sensing area. About 6% of a brightness sensing area is used as the circular cell and is placed in the central part of the brightness sensing area. As shown above in Table 2, when the area $x*y$ of the brightness sensing unit is used to measure the brightness, the circular sensor $\phi$ is selected to be a brightness sensor for automatic back light flashing and back light compensation. Alternatively, when the area $x''*y''$ is used to measure the brightness, the circular sensor $\phi$ is selected.

As described above, according to the preferred embodiments of the present invention, a device and method for sensing brightness is provided. In the disclosed device and method, a sensing area for measuring the brightness of an object is varied in response to the variation of an image angle that varies according to the zoom position of the lens of a zoom camera. By doing so, photographs with optimum exposure can be obtained.

Other embodiments of the invention will be apparent to those skilled in the art from consideration of the specification and practice of the invention as disclosed herein. It is intended that the specification and examples be considered as exemplary only, with the true scope and spirit of the invention being indicated by the following claims.

What is claimed is:

1. A brightness sensing device, by which a brightness sensing area of a camera is varied, comprising:

a zoom position sensing unit which senses the position of a lens displaced according to a zooming operation and outputs an electrical signal corresponding to the sensed position;

a brightness sensing unit which is divided into a plurality of concentric rectangular cells, and wherein the brightness measuring unit measures the brightness applied to a cell and outputs an electrical signal corresponding to the measured brightness, the brightness sensing unit further including:

a central part which is divided into a plurality of concentric circular sensors for performing the functions of back light compensation and automatic flash exposure control under back light conditions, and wherein the circular sensor with the largest area is smaller than the rectangular cell with the smallest area; and a control unit which detects the position of the lens by the signal outputted from the zoom position sensing unit, and wherein the control unit:

selects one cell of the plurality of rectangular cells of the brightness sensing unit, the selected rectangular cell corresponding to the sensed position, to set the exposure value according to the sensed position of the lens; and outputs a driving signal to drive the selected cell.

2. A device as recited in claim 1, wherein the control unit selects one cell of the plurality of cells such that the area of the selected cell corresponds to the value of a variable multiplied by the film size of the camera.

3. A brightness sensing method in which a brightness sensing area of a brightness sensing unit is varied, comprising the steps of:

detecting a current zoom position of a lens when a zooming operation is carried out;

selecting a brightness sensing area of the brightness sensing unit according to the detected zoom position, the brightness sensing unit having a plurality of concentric rectangular cells and a plurality of concentric circular sensors, such that the circular sensor with the largest area is smaller than the rectangular cell with the smallest area;

selecting one of the circular sensors to perform the functions of back light compensation and automatic flash exposure control under back light conditions; and driving a selected cell of the brightness sensing unit, the cell corresponding to the selected brightness sensing area, to measuring the brightness of an object.

4. A method as recited in claim 3, further comprising the steps of:

detecting when the current zoom position corresponds to a wide angle stage, and selecting a cell which has the largest brightness sensing area to be driven to measure the brightness of an object; and detecting when the current zoom position corresponds to a photo angle stage, and selecting a cell which has a smaller brightness sensing area than that selected in the wide angle stage.

5. A device as recited in claim 1, wherein the control unit selects one of the plurality of circular sensors on the basis of which rectangular cell is selected.

6. A method as recited in claim 4, further comprising the step of selecting one of the plurality of circular sensors on the basis of which rectangular cell is selected.

* * * * *